(12) United States Patent
Nishihara et al.

(10) Patent No.: US 7,172,344 B2
(45) Date of Patent: Feb. 6, 2007

(54) OPTICAL FILTER MODULE AND MANUFACTURING METHOD THEREOF

(75) Inventors: Kazunari Nishihara, Osaka (JP); Kazuo Fujiwara, Hyogo (JP); Kanji Kato, Osaka (JP); Mikio Degawa, Osaka (JP); Tetsuro Shimamura, Kyoto (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 98 days.

(21) Appl. No.: 10/381,506

(22) PCT Filed: Oct. 2, 2002

(86) PCT No.: PCT/JP02/10258

§ 371 (c)(1),
(2), (4) Date: Aug. 14, 2003

(87) PCT Pub. No.: WO03/032030

PCT Pub. Date: Apr. 17, 2003

(65) Prior Publication Data
US 2004/0027705 A1    Feb. 12, 2004

(51) Int. Cl.
*G02B 6/00*    (2006.01)
(52) U.S. Cl. .............................. 385/65; 385/73; 385/31
(58) Field of Classification Search .................. 385/27, 385/49–50
See application file for complete search history.

(56) References Cited

U.S. PATENT DOCUMENTS

| | | | | |
|---|---|---|---|---|
| 4,639,074 A * | 1/1987 | Murphy | ........................ | 385/49 |
| 4,958,897 A * | 9/1990 | Yanagawa et al. | ............. | 385/50 |
| 6,215,917 B1 * | 4/2001 | Takahashi et al. | ............. | 385/14 |
| 6,535,655 B1 * | 3/2003 | Hasui et al. | .................... | 385/11 |
| 2002/0104331 A1 * | 8/2002 | Fukuyama et al. | ............. | 65/61 |
| 2004/0042728 A1 * | 3/2004 | Ito et al. | ........................ | 385/49 |

FOREIGN PATENT DOCUMENTS

| | | | | |
|---|---|---|---|---|
| JP | 64-34604 | 3/1989 | ................... | 385/50 |
| JP | 2-284103 | 11/1990 | ................... | 385/50 |
| JP | 6-34837 | 2/1994 | ................... | 385/50 |
| JP | 7-5346 | 1/1995 | ................... | 385/50 |

(Continued)

OTHER PUBLICATIONS

Mitsuda et al., 1998, OFC '98 Technical Digest, Figure 1.*

(Continued)

*Primary Examiner*—Frank G. Font
*Assistant Examiner*—Eric Wong
(74) *Attorney, Agent, or Firm*—RatnerPrestia

(57) ABSTRACT

Precise V-grooves allowing an optical fiber to project are formed in respective main surfaces of an upper plane substrate and a lower plane substrate. The optical fiber is mounted on one plane substrate, and a multi-layer film filter 2 is inserted into a filter insertion groove 1 crossing the precise V-groove in the main surface of the other plane substrate. Then, using the projecting optical fiber and the other precise V-groove as a guide rail, two plane substrates grapple the multi-layer film filter to fix and mount the filter. In an optical filter module obtained in this manner, a process of adjusting an optical axis between input/output optical fibers is eliminated, and displacement of the inserted optical filter is reduced.

12 Claims, 10 Drawing Sheets

FOREIGN PATENT DOCUMENTS

| | | | | |
|---|---|---|---|---|
| JP | 7-281049 | | 10/1995 | ......... 385/50 |
| JP | 8-184712 | | 7/1996 | ......... 385/50 |
| JP | 8-211228 | | 8/1996 | ......... 385/50 |
| JP | 8-297214 | | 11/1996 | ......... 385/50 |
| JP | 09021912 | * | 1/1997 | |
| JP | 9-105824 | | 4/1997 | ......... 385/50 |
| JP | 10-48439 | | 2/1998 | ......... 385/50 |
| JP | 10-307221 | | 11/1998 | ......... 385/50 |
| JP | 02015203 | * | 1/1999 | |
| JP | 2000249874 | * | 9/2000 | |

OTHER PUBLICATIONS

International Search Report corresponding to application No. PCT/JP02/10258 dated Nov. 5, 2002.

English translation of form PCT/ISA/210.

* cited by examiner

OPTICAL FILTER MODULE AND MANUFACTURING METHOD THEREOF

This Application is a U.S. National Phase Application of PCT International Application PCT/JP02/10258.

TECHNICAL FIELD

The present invention relates to an optical filter module for optical communication including an optical fiber and an optical wave guide having an optical filter integrated therein, and to a method of manufacturing the module.

BACKGROUND ART

An optical fiber attenuates light due to radiation or absorption in the fiber in an optical information communication system. An optical fiber amplifier is employed as a system for amplifying the attenuated light. A configuration of the system is shown in FIG. 9A. The optical fiber amplifier includes an optical isolator 53, an optical fiber 51 doped with erbium, a pumping laser 54 for radiating laser beam for excitation, a photo diode (PD) 52 for monitoring an output, and a filter 55 for adjusting a gain. The optical fiber amplifier can amplify a light output without converting an optical signal to an electrical signal, thus being indispensable to an optical communication network.

A wavelength of the pumping laser 54 in a single mode fiber is 1.48 µm. However, the gain depends on a frequency as characteristic A of FIG. 9B. Therefore, a gain flattening filter (GFF) 55 having a characteristic reverse to characteristic A, namely having characteristic B, must be inserted into a transmission path after amplifying an optical output to flatten the gain as total characteristic C.

The GFF 55 is usually inserted between fibers integrally, thus being formed in a module. The structure of the module is shown in FIG. 9C. Optical fibers 56, condensing lenses 57, and a GFF 58 are mounted and sealed into a metal case 59 after their optical axes are aligned.

When the module including the GFF 58 integrally mounted between the optical fibers 56 is manufactured, the optical fibers 56 are temporarily fixed to the metal case 59. The condensing lenses 57 for condensing light diffused from the optical fibers 56 and the GFF 58 are then mounted. Then, while optical signals radiated from the optical fiber 56 at an input side and output from the optical fiber 56 at an output side is measured by a power meter, their optical axes are aligned so as to obtain maximum optical signals. Then, the condensing lenses 57 and the GFF 58 are caulked and fixed to the metal case 59. Thus, four optical axes, i.e., an axis between the optical fiber 56 on the incoming side and the condensing lens 57, an axis between the condensing lens 57 and the gain flattening filter 58, an axis between the gain flattening filter and the condensing lens 57, and an axis between the condensing lens and the optical fiber 56 on the outgoing side must be aligned, thereby increasing cost.

Japanese Patent No. 3175814 discloses a system for addressing the problem discussed above. A structure of the system is shown in FIG. 10A and FIG. 10B. A multi-layer film filter is inserted in an insertion groove crossing a built-in optical wave guide formed in a silicon substrate, thus providing a multiplexer/demultiplexer for wavelength division multiplexing (WDM). The filter system including a silicon substrate 31, a clad member 32, a wave guide 33 for input, a common port 331, a first wave guide 34 for output, a first output port 341, a second wave guide 35 for output, a second output port 351, an insertion groove 36 for a multi-layer film filter, and the multi-layer film filter 37. The filter system includes passages guiding light as the waveguides and is formed in one plane. The filter insertion groove 36 crossing the wave guides allows respective optical axes of the wave guides 33, 35, and 34 not to be required to adjust.

The filter insertion groove 36 having a width (W), a thickness (Df), and a width (Dg) satisfies, with the multi-layer film filter 37 having a camber of a curvature radius (R), the relation:

$$R<W^2/8(Dg-Df).$$

Under the relation, the multi-layer film filter 37 can be securely fixed in the filter insertion groove 36 due to the camber of the filter. In other words, the built-in optical wave-guide forms an optical wave guide path, and a various filter is integrally inserted into the path.

However, the multi-layer film filter 37 in this filter system necessarily has the camber of a curvature. The camber makes incidence angle to the multi-layer film filter shift largely due to its mounting displacement. The built-in optical wave guide, upon being employed as the optical wave guide path, creates gaps formed inevitably between the wave guides 33, 35 and the multi-layer film filter 37 in the filter insertion groove 36. Light diffuses from wave-guides 33, 35 through the gaps and disappears. In addition, it is difficult to mechanically hold a component having a camber and to insert it into a micro groove.

SUMMARY OF THE INVENTION

An optical filter module includes a filter, first and second optical fibers having respective cross sections face each other on respective sides of the filter, a first substrate having a surface having a first groove and a filter insertion groove formed therein, a second substrate grappling the first optical fiber with the first substrate, and a third substrate grappling the second optical fiber with the first substrate, grappling the filter with the second substrate, and having a third groove formed therein for holding the second optical fiber therein. The first groove holds the first and second optical fibers therein, and the filter insertion groove fixes the filter therein and crossing the first groove. The second substrate has a second groove formed therein for holding the first optical fiber therein.

In the optical filter module, the multi-layer film filter can be securely fixed and mounted to an end surface of the optical fiber without relying on a camber of the filter. An upper plane substrate grapples the multi-layer film filter, so that the camber of the multi-layer film filter is corrected, and incident angles for the optical fiber and the multi-layer film filter are stabilized.

DESCRIPTION OF THE PREFERRED EMBODIMENTS (Exemplary Embodiment 1)

Figure 1A:
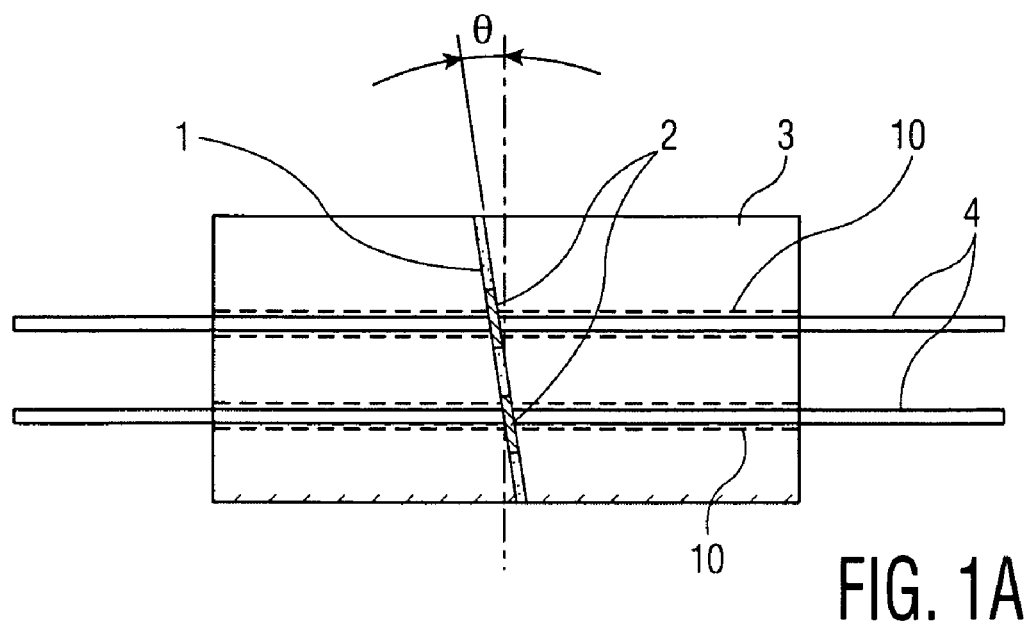
FIG. 1A is a top view of an optical filter module in accordance with exemplary embodiment 1 of the present invention.
Figure 1B:
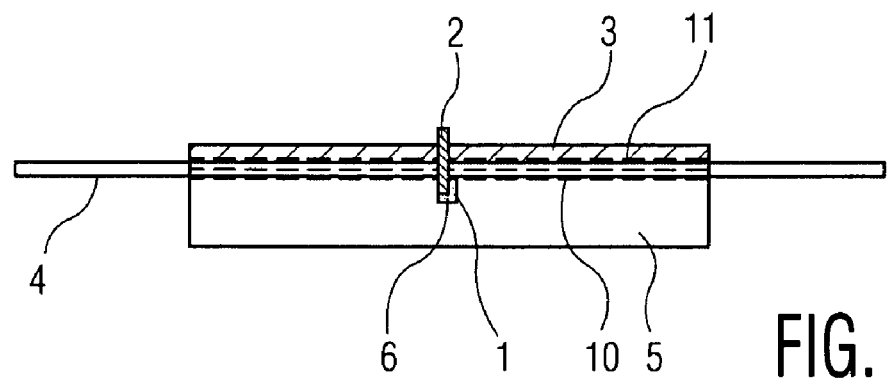
FIG. 1B is a side view of the optical filter module in accordance with embodiment 1.
Figure 1C:
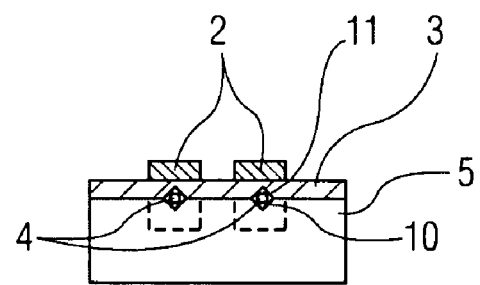
FIG. 1C is a sectional view of the optical filter module in accordance with embodiment 1.

FIG. 1A is a twin-core optical filter module in accordance with exemplary embodiment 1 of the present invention. FIG. 1B is a side view of the optical filter module, and FIG. 1C is a sectional view of the optical filter module. The module includes an insertion groove 1 for a multi-layer film filter, a multi-layer film filter 2, an upper plane substrate 3, an optical path 4, a lower plane substrate 5, and an optical adhesive 6. Respective main surfaces of the upper plane substrate 3 and the lower plane substrate 5 have V-shaped-grooves 10 and 11 formed therein.

The multi-layer film filter 2 includes, for example, many dielectric films made of $SiO_2$ or $Ta_2O_5$ and laminated on a resin substrate made of glass or polyimide. The upper plane substrate 3 and the lower plane substrate 5 are made of glass or silicon, and their linear expansion coefficients are preferably close to that of the optical path 4. A resin-based adhesive, upon fixing the substrates, however, has elasticity to moderate stress caused by difference between the linear expansion coefficients. A photo-curing adhesive, upon being used, is preferably made of light-transmittable material. The optical adhesive 6 has a refractive index equivalent to material of the optical path 4 so as to prevent light from dispersing from end surfaces of the optical path.

If the optical path 4 is made of quartz glass series, refractive index of the optical adhesive 6 is preferably close to refractive index of 1.44 of the quartz glass. The optical path 4 is implemented, for example, by an optical fiber, and the upper plane substrate 3 and the lower plane substrate 5 have V-grooves 10 and 11 for mounting and fixing the optical fiber, respectively. The V-grooves 10 and 11 have uniform depths and angles. The V-grooves 10 and 11 having certain depths and angles in the plane substrates 3 and 5 enables the plane substrates 3 and 5 to hold the optical fiber without displacement.

Tip angle α and depth d of the V-grooves 10 and 11 and radius r of the mounted optical fiber satisfies the relation:

$$d = r/\sin(\alpha/2).$$

The relation allows the center of the optical fiber to align at the surfaces of the plane substrates 3 and 5. A clad as the optical path of a glass-based optical fiber typically has a diameter of 125 μm. If each of the V-grooves 10 and 11 has a tip angle of 90 degrees a depth of about 180 μm, the upper and lower plane substrates 3, 5 grapple the optical fiber, thereby securely fixing the optical fiber.

The V-grooves 10 and 11 formed in the upper and lower plane substrates 3, 5 do not necessarily have the same depth and angle. The angle and depth of the V-groove 11 formed in one plane substrate for grappling the optical fiber may be more than a projection amount of the optical fiber from the main surface of another plane substrate having the optical fiber mounted in the V-groove 10 formed in another substrate. This arrangement enables the optical fiber to be securely mounted and fixed onto the upper and lower plane substrates 3, 5. However, if the V-grooves 10, 11 formed in the main surfaces of the plane substrates 3, 5 for grappling the optical fiber are larger than necessary, the upper plane substrate 3 does not function as a guide effectively in a manufacturing method described below. Therefore, the angles and depths of the V-grooves 10 and 11 ranges appropriately.

If the V-grooves 10 and 11 have the same tip angles, and if the V-groove 10 formed in one plane substrate has the depth for embedding the optical fiber at its center, the depth of the V-groove 11 formed in another plane substrate should be 10% longer than that of the V-groove 10. The filter insertion groove 1 formed in the lower plane substrate 5 is aligned by a predetermined angle θ with respect to the optical fiber. The angle θ prevents light incoming through the optical fiber to the multi-layer film filter 2 from being reflected, and depends on the wavelength of guided light. When a single mode fiber (SMF) guides light having a wavelength of 1.48 μm, the angle θ is preferably about 5 to 10 degrees.

A core radius expansion fiber, which includes a core partially expanded for confining and guiding the light, upon used as the optical fiber, can further reduce the coupling loss between the optical fiber and the multi-layer film filter 2.

In the optical filter module of embodiment 1, the multi-layer film filter 2 is inserted into the filter insertion groove 1 crossing optical path 4. Therefore, path of the optical fiber is divided by the filter insertion groove 1, and a gap having a width G identical to that of the filter insertion groove 1 is provided between end surfaces of the optical fibers via the multi-layer film filter 2. When a light spot sizes w on the end surfaces of the optical fibers are identical to each other, a power transmission coefficient Tg through the gap (width G) between the end surfaces of the optical fibers is expressed by the equation:

$$Tg = [1 + \{\lambda \times G/(2 \times \pi \times n \times w^2)\}^2]^{-1},$$

where, n is refractive index of the multi-layer film filter 2, and λ is a wavelength of the light.

This equation shows that the transmission loss increases in proportion to increase of the wavelength or the gap width G and decreases rapidly in proportion to the inverse of the square of the spot size. Thus, the transmission loss decreases according to increasing of the spot size at the end surfaces of the optical fibers exposed at walls of the filter insertion groove 1. The core radius expansion fiber is represented by a thermally expanded core (TEC) fiber. The TEC fiber is a special fiber having a radius of a core substantially expanded by diffusing dope elements, such as $GeO_2$, for controlling a refractive index of the core. The dope elements are diffused by heating a portion of a clad of the fiber. The TEC fiber can increase the spot size of the light from the end surfaces of the optical fibers. In the optical filter module of embodiment 1 including the core radius expansion fiber, the filter insertion groove 1 preferably be machined and formed so as to cross a portion of the largest radius of the expanded core of the optical fiber.

Figure 2A:
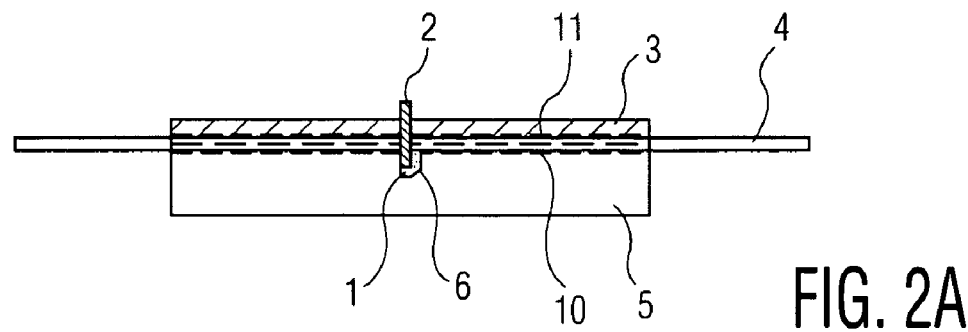
FIG. 2A through FIG. 2D are side views of the optical filter module in accordance with embodiment 1.
Figure 2B:
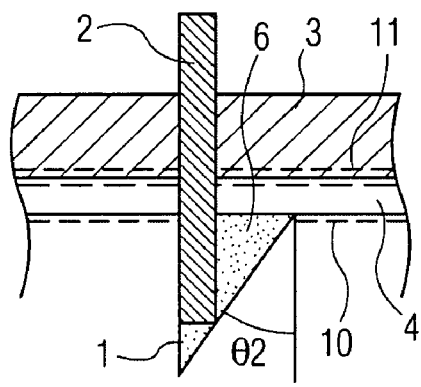
Figure 2C:
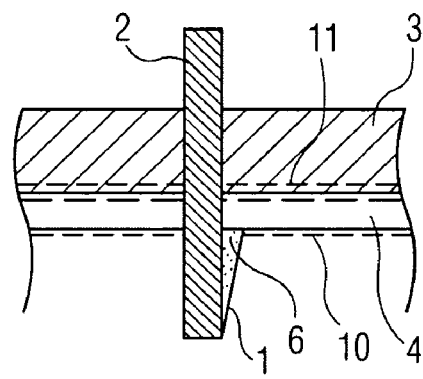
Figure 2D:
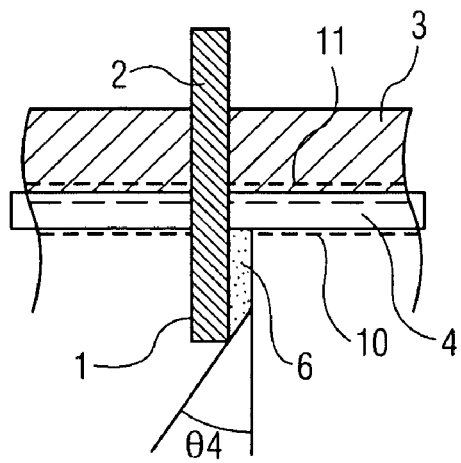

The filter insertion groove 1 can have various shapes shown in FIG. 2B through FIG. 2D. In each shape, one wall of the wall is shallow, and the other wall of the groove is deep at the bottom of the filter insertion groove 1. In FIG. 2B, one wall of the groove is formed from the bottom of the filter insertion groove 1 to the main surface of the lower plane substrate 5 at a constant angle θ2. In FIG. 2C, the bottom of the filter insertion groove 1 includes a flat portion. In FIG. 2D, the bottom of the filter insertion groove 1 includes a flat portion, and a part of one wall of the groove slopes at a small angle θ4. The filter insertion groove 1 is formed with, for example, a diamond grindstone having its tip previously formed in the shape of the groove. The shape of the filter insertion groove 1 is the same as that of the tip of the diamond grindstone, so that the shape of the groove 1 largely depends on the accuracy of the diamond grindstone. If the width of the grindstone is 0.1 mm or less, it is difficult to form the groove 1 due to a size of available diamond grain. If the width of the grindstone exceeds 0.1 mm, the groove 1 is relatively easily formed.

Since the filter insertion groove 1 has one wall sloping and another wall gentler than one wall, as shown in FIG. 2B to FIG. 2D, the multi-layer film filter 2 after insertion is prevented from tilting. While the filter insertion groove 1 is formed, the end surface of the upper plane substrate 3 having the fiber mounted thereon, i.e., a reference surface in a manufacturing method discussed below, receives a force in a direction that the diamond grindstone is pressed to the upper plane substrate 3 as the reference surface. This operation prevents the forming accuracy of the filter insertion groove 1 from degrading due to meandering of the diamond grindstone. In above discussion, the module includes two optical fibers, however, the module may include a multiple array having more fibers.

(Exemplary Embodiment 2)

Referring to FIGS. 3A to 3G and FIGS. 4A to 4G, methods of manufacturing an optical filter module in accordance with exemplary embodiment 2 of the present invention will be described.

Figure 3A:
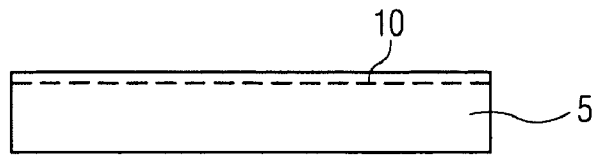
FIG. 3A through FIG. 3G show a method of manufacturing an optical filter module in accordance with exemplary embodiment 2 of the invention.
Figure 3B:
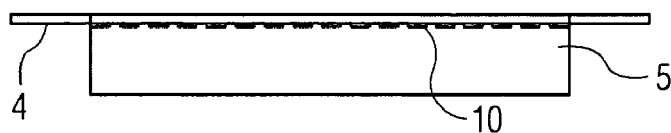
Figure 3C:
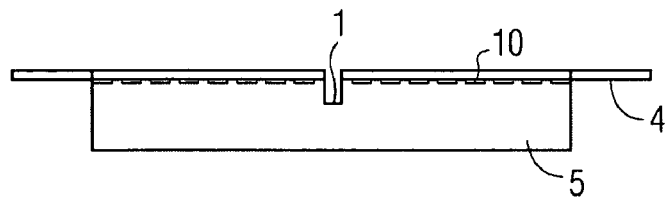

In FIGS. 3A to 3C, the optical filter module includes an insertion groove 1 for a multi-layer film filter, a multi-layer film filter 2, an upper plane substrate 3, an optical fiber 4 as an optical path, a lower plane substrate 5, and an optical adhesive 6, a precise V-groove 10 formed in the main surface of the lower plane substrate 5, and a precise V-groove 11 formed in the main surface of the upper plane substrate 3. Reference numeral 12 denotes a light source, such as ultraviolet ray, or a heat source.

In a method of manufacturing the optical filter module in accordance with embodiment 2, as shown in FIG. 3A, the upper plane substrate 3 and the lower plane substrate 5 having precise V-grooves 10 and 11 in their main surfaces are prepared. The plane substrates 3 and 5 preferably are preferably made of material having a linear expansion coefficient equivalent to that of the optical fiber 4 mounted and fixed in a subsequent process, and being light-transmittable since the plane substrates 3 and 5 are fixed with a photo-curing adhesive.

Then, as shown in FIG. 3B, the optical fiber 4 is mounted and fixed on the lower plane substrate 5. The mounted portion of the optical fiber 4 is preferably a clad having no coating in consideration of mounting accuracy. The angle and depth of the V-groove 10 are determined so as to project the mounted optical fiber 4 from the main surface of the lower plane substrate 5. The optical fiber 4 projecting as a guide rail enables the upper plane substrate 3 to be positioned easily. The core radius expansion fiber may be used as the projecting optical fibers 4, thereby expanding a spot size at the end surfaces of the optical fibers 4 and reducing transmission loss or coupling loss between the optical fibers 4.

Next, as shown in FIG. 3C, the filter insertion groove 1 crossing the optical fibers 4 is formed in the main surface of the lower plane substrate 5 having the optical fiber 4 mounted thereon. The multi-layer film filter 2 is inserted into the filter insertion groove 1 in a subsequent process. The optical fibers 4 and the filter insertion groove 1 are crossed each other at a certain angle for preventing reflection of light at a surface of the multi-layer film filter 2. The angle of the crossing, which depends on the wavelength of light, generally ranges from 5 through 10 degrees. If the core radius expansion fiber is used as the projecting optical fiber 4, the filter insertion groove 1 preferable crosses a portion having the largest radius of the core.

The filter insertion groove 1 is formed simultaneously to dividing of the optical fiber 4. For reducing roughness of the end surfaces of the cut and divided optical fiber 4, an abrasive grain size of the grindstone is as small as possible for machining. The filter insertion groove 1 is formed with a diamond grindstone according to embodiment 2, and the diamond grain of #3000 or more, i.e., average diameter of 4 μm to 5 μm or more, provides substantially-specular end surfaces of the optical fiber 4.

Figure 3D:
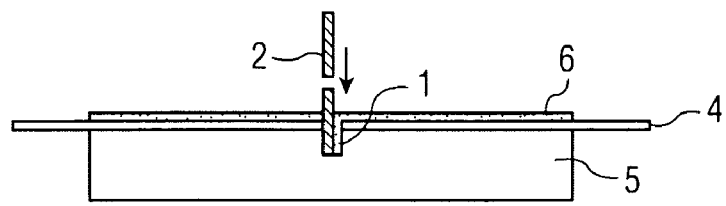

Next, as shown in FIG. 3D, the entire main surface of the lower plane substrate 5 is coated with the optical adhesive 6, and the multi-layer film filter 2 is inserted into the filter insertion groove 1 filled with the optical adhesive 6. The multi-layer film filter 2 has its size for having its upper portion project from the main surface of the lower plane substrate 5. The amount of the projected portion of the multi-layer film filter 2 is preferably at least one half or more of the thickness of the upper plane substrate. The optical adhesive 6 is put also into the filter insertion groove 1 formed in the previous process. The optical adhesive 6 has a refractive index equivalent to that of material of the core of the optical fiber 4, thereby reducing coupling loss between the fibers. The optical adhesive 6 may be cured with light, such as ultraviolet ray, or heating, however, be preferably cured with the light for reducing a manufacturing time.

Figure 3E:
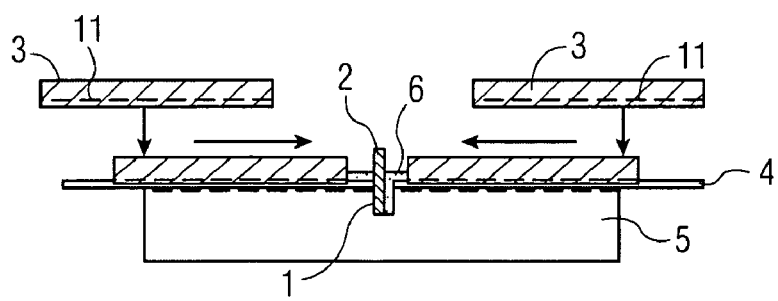
Figure 3F:
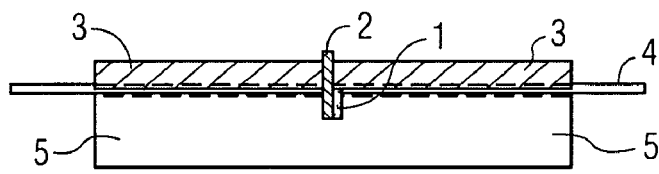

Then, as shown in FIG. 3E and FIG. 3F, the upper plane substrates 3 having the V-grooves 11 in its main surfaces are moved from respective sides of the multi-layer film filter 2 projecting from the filter insertion groove 1. At this moment, the optical fiber 4 projecting from the main surface of the lower plane substrate 5 functions as a guide rail. The multi-layer film filter 2 inserted into the filter insertion groove 1 is then grappled from both sides and fixed. In this process, one upper plane substrate 3 has a side surface contact a wall of the filter insertion groove 1, thereby mounting and fixing the inserted multi-layer film filter 2 along the wall of the filter insertion groove 1. This operation prevents the multi-layer film filter 2 from breaking when the filter is grappled with the other upper plane substrate 3.

The projecting portion of the multi-layer film filter 2 is grappled. If the multi-layer film filter 2 cambers, the amount of the projecting portion thereof may be extended to have an area of the portion grappled with the upper plane substrate 3 enlarged to correct the camber. The multi-layer film filter 2 includes a substrate of glass can be prevented from breakage by stress since the glass has a large elastic coefficient. The angle and depth of the V-groove 11 formed in the main surface of upper plane substrate 3 are determined according to the amount of the projecting portion of the optical fiber 4. Tolerances of the angle and depth of the V-groove 11 against the amount of the projecting portion of the fiber reduces an effect as the guide rail of the optical fiber 4. The V-groove 11 smaller than the projecting amount of the optical fiber 4 reduces the effect as the guide rail and reliability. The reliability is reduced since the upper plane substrates 3 are mounted to the lower plane substrate 5 inclinedly about the optical fiber 4.

Figure 3G:
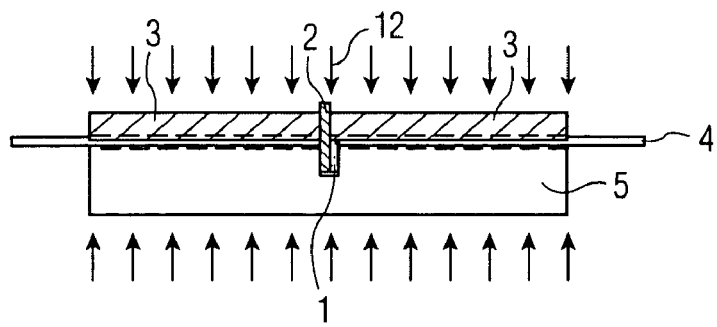

Finally, as shown in FIG. 3G, light, such as ultraviolet ray, is radiated or heat is applied from one side or both sides of the upper and lower plane substrates 3, 5 to cure and finish the optical filter module. The optical fiber 4 is mounted and fixed to the lower plane substrate 5, and is then cut simultaneously to forming of the filter insertion groove 1 in the processes discussed above. This process allows the optical axis of the end surfaces of the optical fiber 4 divided into two not to be required to align. Additionally, the cutting of the optical fiber 4 and the forming of the filter insertion groove 1 are simultaneously performed, thereby reducing manufacturing time.

Figure 4A:
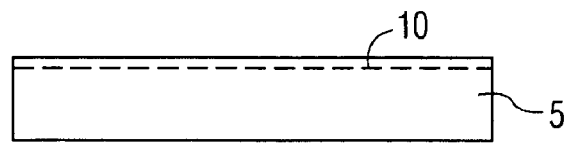
FIG. 4A through FIG. 4G show another method of manufacturing an optical filter module in accordance with embodiment 2.
Figure 4B:
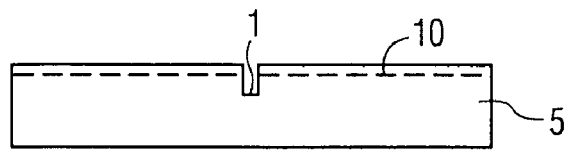
Figure 4C:
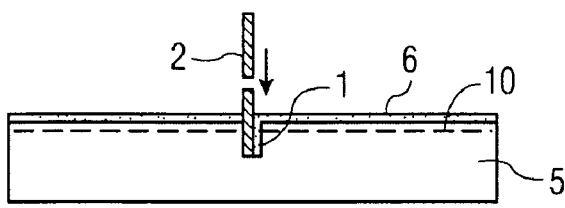

In a manufacturing method shown in FIG. 4, a precise V-groove 10 is formed in the main surface of the lower plane substrate 5, as shown in FIG. 4A. A filter insertion groove 1 crossing the precise V-groove 10 is then formed in the main surface of the lower plane substrate 5, as shown in FIG. 4B. Then, as shown in FIG. 4C, the main surface of the lower plane substrate 5 is coated with an optical adhesive 6, and the multi-layer film filter 2 is inserted into the filter insertion groove 1.

Figure 4D:
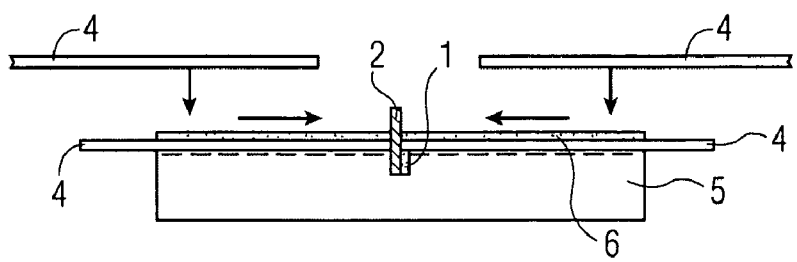
Figure 4E:
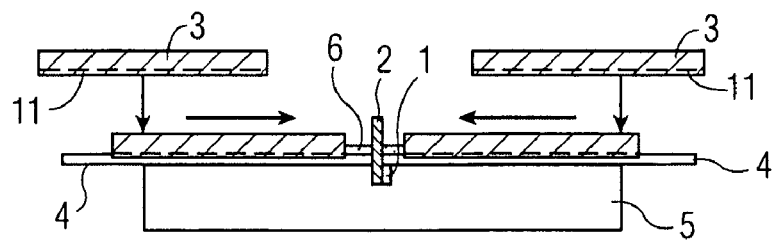
Figure 4F:
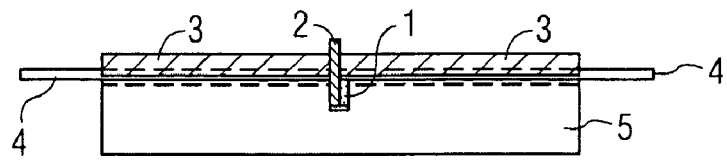
Figure 4G:
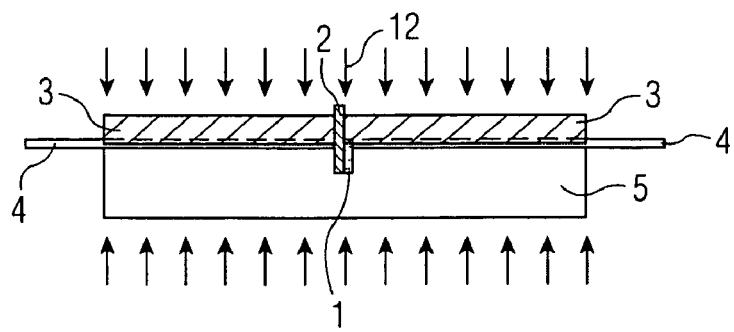

Then, as shown in FIG. 4D, previously divided optical fibers 4 are mounted and fixed along the V-groove 10 formed in main surface of the lower plane substrate 5. At this moment, the multi-layer film filter 2 contacts a wall of the filter insertion groove 1, thus being prevented from breakage when the multi-layer film filter 2 is grappled with upper plane substrates 3. In this case, the optical fibers 4 have the end surfaces finished previously specularly, thus having a reduced transmission loss and coupling loss between the optical fibers 4. The end surfaces of the optical fibers 4 contact the main surface of the inserted multi-layer film filter 2, thereby further reducing the transmission loss and coupling loss between the optical fibers 4. Processes shown in FIG. 4E through FIG. 4G are the same as those of FIG. 3E through FIG. 3G, thus not being described.

(Exemplary Embodiment 3)

Referring to FIG. 5A through FIG. 8I, methods of manufacturing optical filter modules in accordance with exemplary embodiment 3 of the present invention will be described.

Figure 5A:
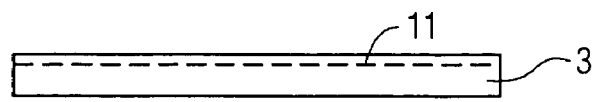
FIG. 5A through FIG. 5I show a method of manufacturing an optical filter module in accordance with exemplary embodiment 3 of the invention.

In a method of manufacturing the optical filter module in accordance with exemplary embodiment 3, firstly, plane substrates 3 and 5 having precise V-grooves 10 and 11 in their main surfaces, respectively, are prepared, as shown in FIG. 5A. The plane substrates 3 and 5 is preferably made of material having a linear expansion coefficient equivalent to that of an optical fiber 4 mounted and fixed in a subsequent process. The material may preferably be light-transmittable since the upper and lower plane substrates 3, 5 are fixed with a photo-curing adhesive.

Figure 5B:
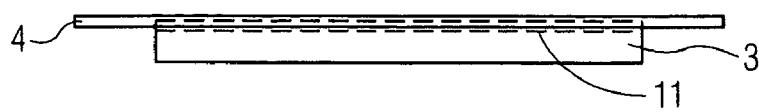

Then, as shown in FIG. 5B, the optical fiber 4 is mounted and fixed in the precise V-groove 11 formed in the main surface of the upper plane substrate 3. The mounted portion of the optical fiber 4 may preferably includes a clad having no coating, such as resin, in consideration of the mounting accuracy. The angle and depth of the V-groove 11 are determined to allow the mounted and fixed optical fiber 4 to project from the main surface of the lower plane substrate 5. The upper plane substrate 3 is thus easily positioned using the projecting optical fiber 4 as a guide rail. A core radius expansion fiber may be used as the projecting optical fiber 4, thereby expanding a spot size at the end surfaces of the optical fiber 4 and reducing the transmission loss or coupling loss between the optical fibers 4.

Figure 5C:

Next, as shown in FIG. 5C, the upper plane substrate 3 having optical fiber 4 mounted and fixed thereon in the previous process is cut and divided. If the core radius expansion fiber is used as the optical fiber 4, a portion having the largest radius of a core is cut. Finishing the cut surface of the optical fibers 4 in specular reduces the coupling loss between the optical fibers 4. When the cut surfaces are used as they are, the cutting condition must be considered. If the upper plane substrate 3 is cut with a diamond grindstone or the like, the grindstone has small abrasive grain size determined so that the end surface of cut optical fibers 4 is as specular as possible. According to this embodiment, the diamond grindstone is used to form a filter insertion groove 1. The diamond grindstone includes diamond grain of #3000 or more, thereby allowing the end surfaces of the optical fibers 4 to be substantially specular.

Figure 5D:
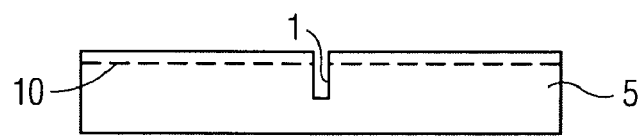

Next, as shown in FIG. 5D, the filter insertion groove 1 crossing the precise V-groove 10 at a certain angle is formed in the main surface of the lower plane substrate 5. The crossing angle, which is determined according to the wavelength of employed light, generally ranging from 5 to 10 degrees. The filter insertion groove 1 may be formed by grinding with a grindstone, or by powder machining, such as blasting. The grindstone, for example, has the shape of the groove and employs cBN and diamond as abrasive grain. The plane substrates made of silicon enabling the groove 1 to be formed by wet etching or dry etching. When the cross section of the filter insertion groove 1 is machined as discussed in embodiment 1, the shape is formed relatively freely with the grindstone.

Figure 5E:
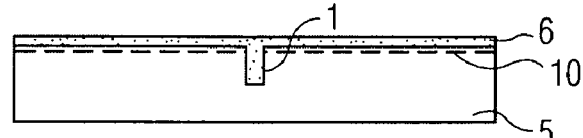

Next, as shown in FIG. 5E, the entire main surface of the lower plane substrate 5 is coated with an optical adhesive 6. At this moment, the optical adhesive 6 is put also into the filter insertion groove 1 formed in the previous process. The optical adhesive 6 has a refractive index equivalent to that of material of a core of the optical fibers 4, thereby reducing the coupling loss between the optical fibers 4. The optical adhesive 6 is cured with light, such as ultraviolet ray, or heating. The curing with the light is more advantageous for reducing manufacturing time.

Figure 5F:
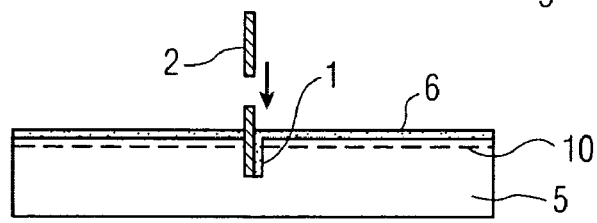

Then, as shown in FIG. 5F, the multi-layer film filter 2 is inserted into the filter insertion groove 1 filled with the optical adhesive 6. The multi-layer film filter 2 has its size to allowing the upper part of the inserted multi-layer film filter 2 to project from the main surface of the lower plane substrate 5. The amount a projecting portion of the multi-layer film filter 2 is preferably at least one half or more of the thickness of the upper plane substrate 3.

Figure 5G:
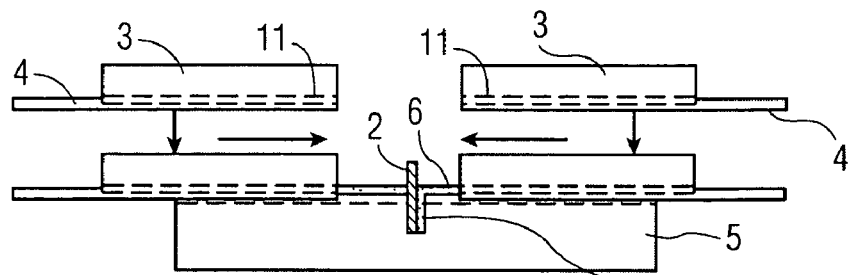
Figure 5H:
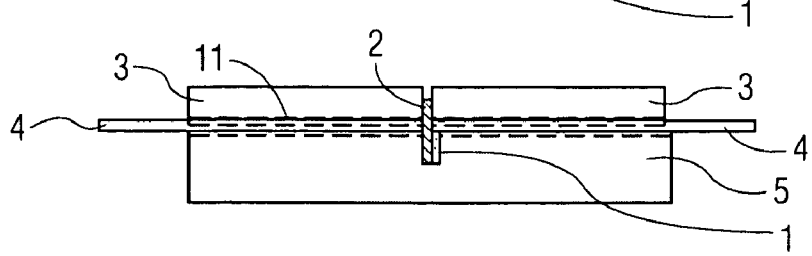

Then, as shown in FIG. 5G and FIG. 5H, the upper plane substrates 3 having the V-groove 11 in the main surface are moved from respective sides of the multi-layer film filter 2 projecting from the filter insertion groove 1. At this moment, the optical fiber 4 projecting from the main surface of the lower plane substrate 5 functions as a guide rail. The multi-layer film filter 2 inserted into the filter insertion groove 1 is grappled from their both sides and fixed. In this process, one upper plane substrate 3 is mounted so that a side surface of the upper plane substrate 3 is aligned to a wall of the filter insertion groove 1, thereby mounting and fixing the inserted multi-layer film filter 2 on the wall of the filter insertion groove 1. This operation prevents the multi-layer film filter 2 from breakage when the filter is grappled with the other upper plane substrate 3.

The multi-layer film filter 2 is grappled at its projecting potion. If the multi-layer film filter 2 cambers, the amount of its projecting portion has an enlarged area of a portion grappled by the upper plane substrate 3 to correct the camber. The multi-layer film filter 2 including a substrate of glass can be prevented from breakage due to stress since the glass has a large elastic coefficient. The angle and depth of the V-groove 11 formed in the main surface of each upper plane substrate 3 are determined according to the amount of the projecting portion of the optical fiber 4. Tolerances of the angle and depth of the V-groove 11 for the projecting amount reduces an effect as the guide rail of the optical fiber 4. The V-groove 11 smaller than the projecting amount of the optical fiber 4 reduces the effect as the guide rail and reliability. The reliability may is reduced since the upper plane substrates 3 are mounted to the lower plane substrate 5 inclinedly about the optical fiber 4.

Figure 5I:
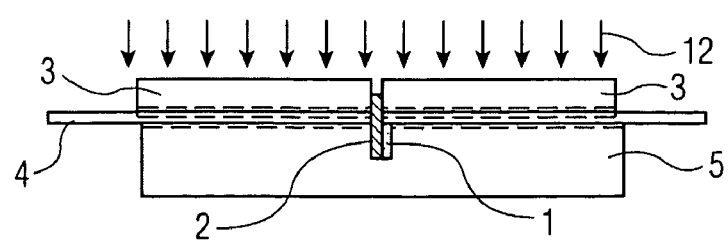

Finally, as shown in FIG. 5I, light 12, such as ultraviolet ray, is radiated, or heat 12 is applied from one side or both sides of the upper and lower plane substrates 3, 5 to cure and finish the optical filter module. In the manufacturing method of the present embodiment, the upper plane substrates 3 previously having the optical fibers 4 mounted thereon are prepared as discussed above. This preparation enables the process of applying the optical adhesive 6, the process of inserting the multi-layer film filter 2, and the process of grappling the multi-layer film filter 2 by the upper plane substrates 3 to be executed continuously, and facilitates manufacturing control.

Figure 6A:
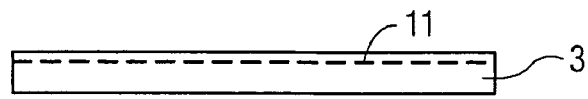
FIG. 6A through FIG. 6I show another method of manufacturing an optical filter module in accordance with embodiment 3.
Figure 6B:
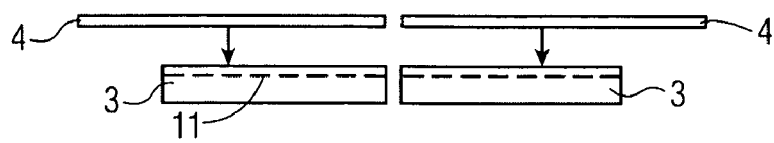
Figure 6C:
Figure 6D:
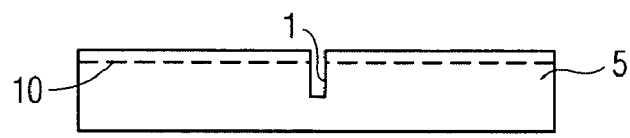
Figure 6E:
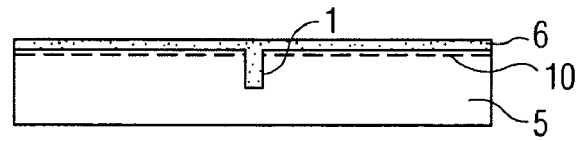
Figure 6F:
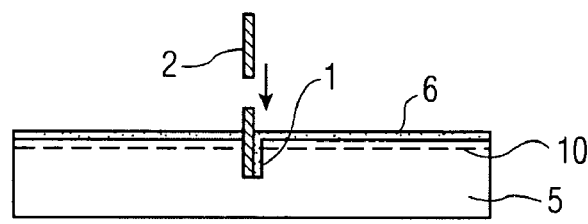
Figure 6G:
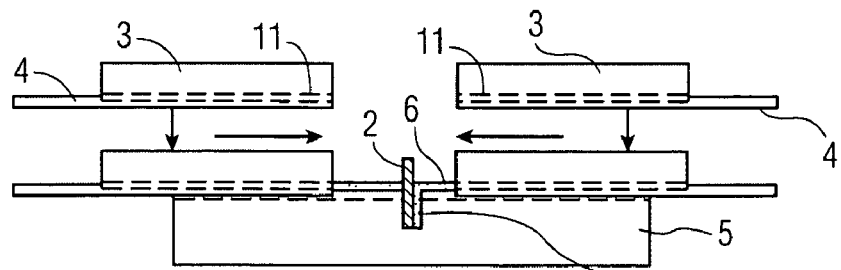
Figure 6H:
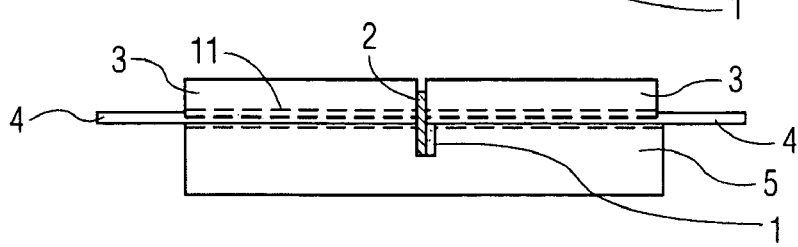
Figure 6I:
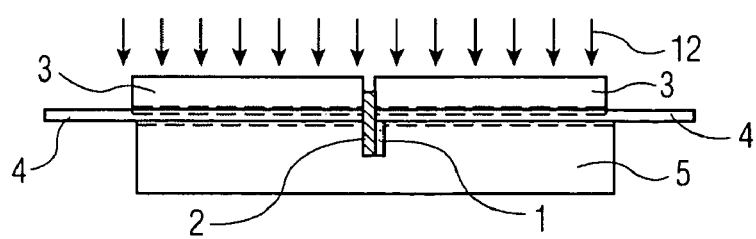

In a manufacturing method shown in FIG. 6A through FIG. 6I, a precise V-groove 11 is formed in the main surface of an upper plane substrate 3, as shown in FIG. 6A. The upper plane substrate 3 is then divided into two, as shown in FIG. 6B, and two optical fibers 4 are mounted to the respective upper plane substrates 3 divided so that an end surface of each optical fiber 4 fits to an end surface of each upper plane substrate 3. A special processing, such as specular finish or spherical polishing, can be applied to the end surfaces of the optical fibers 4, so that the coupling loss between the optical fibers 4 can advantageously reduced. The subsequent processes shown in FIG. 6C through FIG. 6I are the same as those of FIG. 5C through FIG. 5I, and their descriptions are therefore omitted.

Figure 7A:
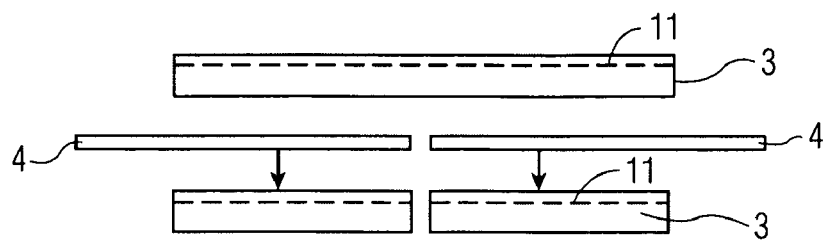
FIG. 7A through FIG. 7I show further method of manufacturing an optical filter module in accordance with embodiment 3.
Figure 7B:
Figure 7C:
Figure 7D:
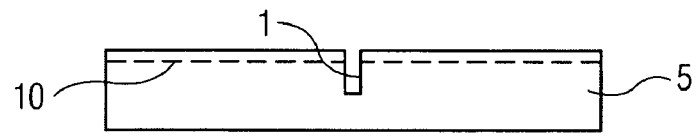
Figure 7E:
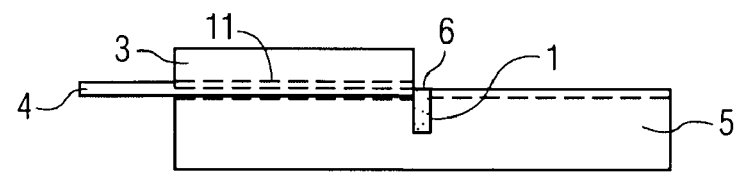

In a manufacturing method shown in FIG. 7A through FIG. 7I, a filter insertion groove 1 crossing a precise V-groove 10 at a certain angle is formed in the main surface of the lower plane substrate 5. Processes shown in FIG. 7A through FIG. 7D are the same as those of FIG. 5A through FIG. 5D. In FIG. 7E, one upper plane substrate 3 having the optical fiber 4 mounted thereon is guided by the precise V-groove 10 formed in the main surface of the lower plane substrate 5 and contacts the main surface of the lower plane substrate 5. The upper plane substrate 3 is positioned and fixed so that the end surface of the optical fiber 4 mounted on the upper plane substrate 3 contacts a wall of the filter insertion groove 1.

Figure 7F:
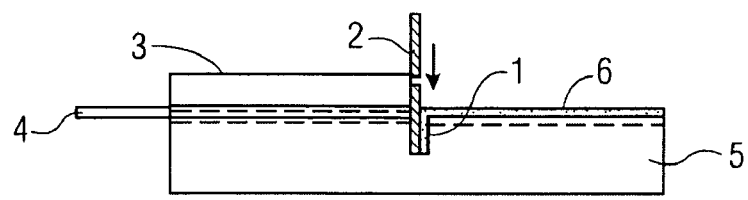

As shown in FIG. 7E, an optical adhesive 6 is then applied to the main surface of the lower plane substrate 5 before having upper plane substrate 3 mounted thereon. At this moment, the optical adhesive 6 is also put into the filter insertion groove 1. In FIG. 7F, a multi-layer film filter 2 is then inserted into the filter insertion groove 1 to contact the end surface of the fixed upper plane substrate 3. The multi-layer film filter 2 contacts the filter insertion groove 1 and the end surface of the upper plane substrate 3, thus being prevented from breaking when the filter is grappled with the other upper plane substrate 3.

Figure 7G:
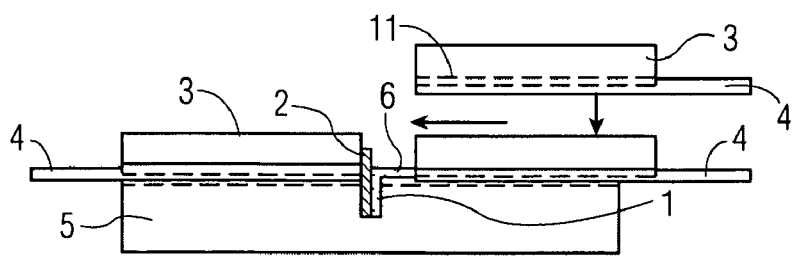
Figure 7H:
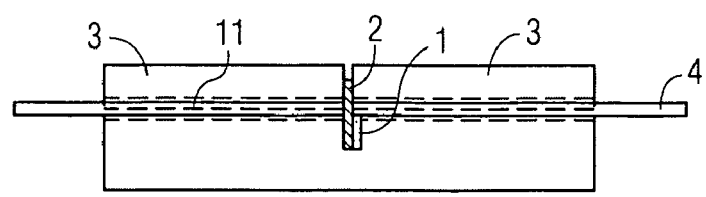

As shown in FIG. 7G and FIG. 7H, the other upper plane substrate 3 is then disposed on a portion of the main surface of the lower plane substrate 5 having no upper plane substrate 3 mounted thereon. The upper plane substrate 3 moves so as to make the optical fiber 4 projecting from the main surface of the upper plane substrate 3 slide along the precise V-groove formed in the main surface of the lower plane substrate 5. Then, the substrate 3 abuts on the multi-layer film filter 2 inserted into the filter insertion groove 1 to grapple and fix the filter 2.

Figure 7I:
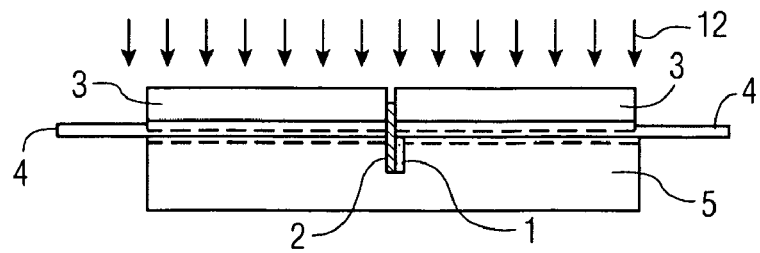

In FIG. 7I, finally, light 12, such as ultraviolet ray, is radiated, or heat 12 is applied from one side or both sides of the upper and lower plane substrates 3, 5 to cure and finish the optical filter module. The inserted multi-layer film filter 2 is fixed on the upper plane substrate 3 and the wall of the filter insertion groove 1, thus being prevented from breaking. Since one upper plane substrate 3 is previously fixed, the other upper plane substrate 3 is easily positioned.

Figure 8A:
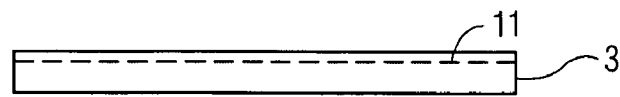
FIG. 8A through FIG. 8I show still another method of manufacturing an optical filter module in accordance with embodiment 3.
Figure 8B:
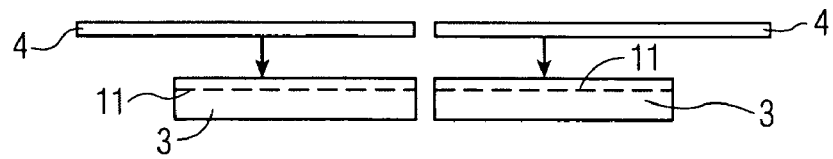
Figure 8C:
Figure 8D:
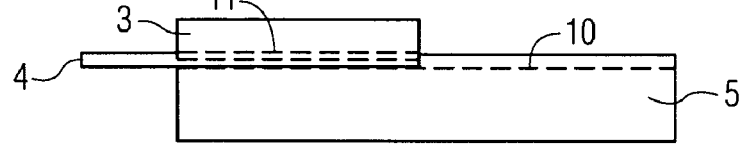
Figure 8E:
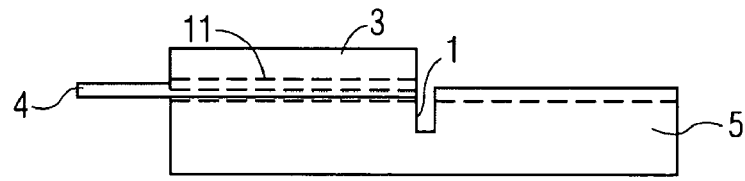
Figure 8F:
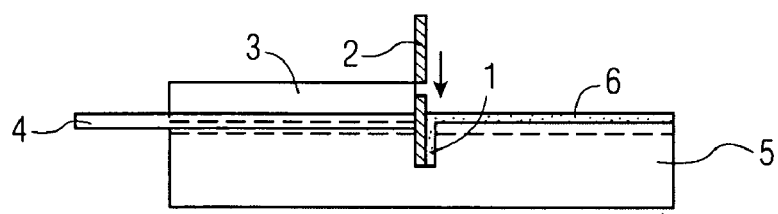
Figure 8G:
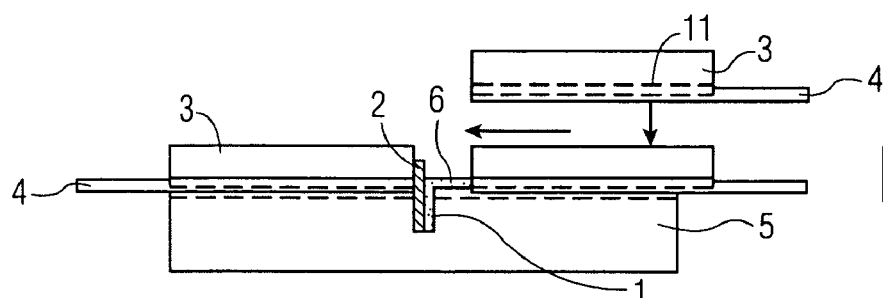
Figure 8H:
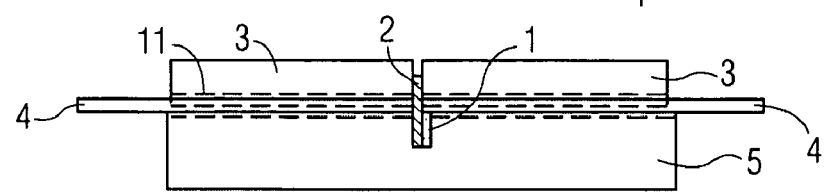
Figure 8I:
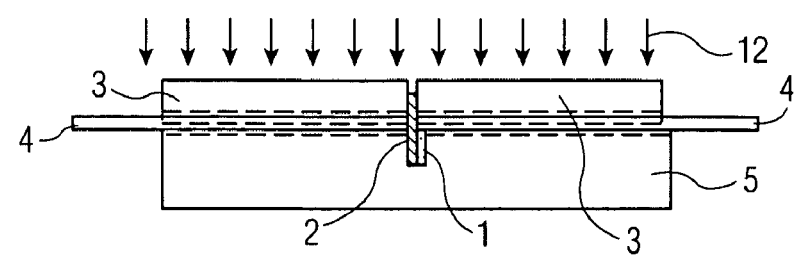
Figure 9A:
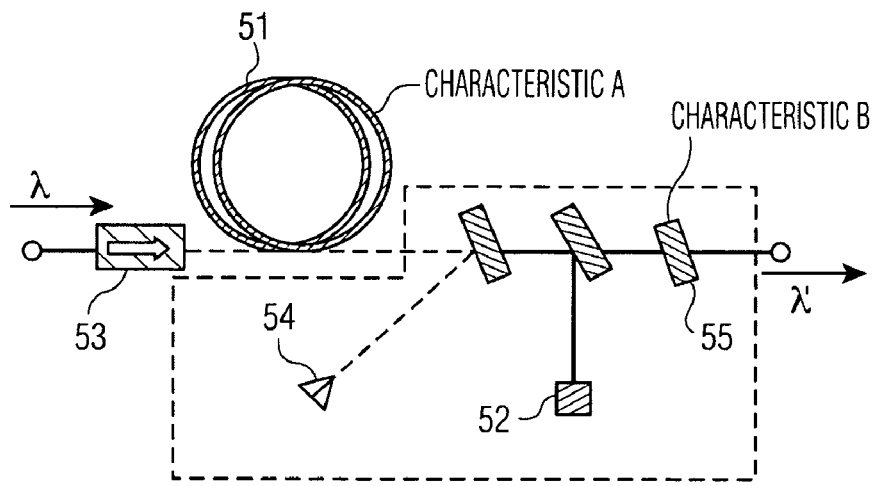
FIG. 9A is a block diagram of a conventional optical amplifying system.
Figure 9B:
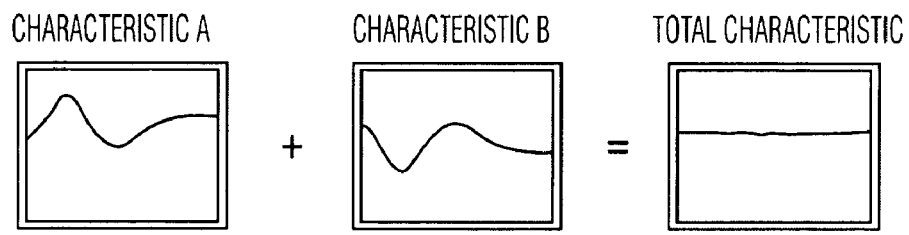
FIG. 9B shows characteristics of the conventional optical amplifying system.
Figure 9C:
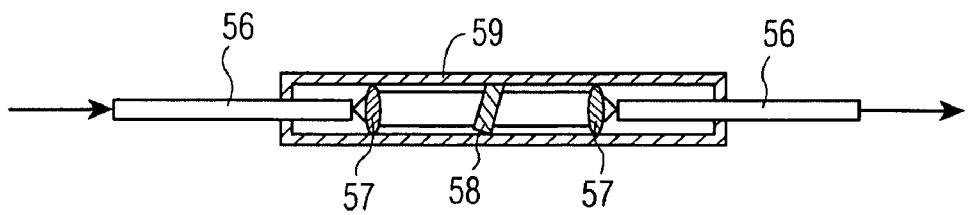
FIG. 9C is a block diagram of the conventional optical filter module.
Figure 10A:
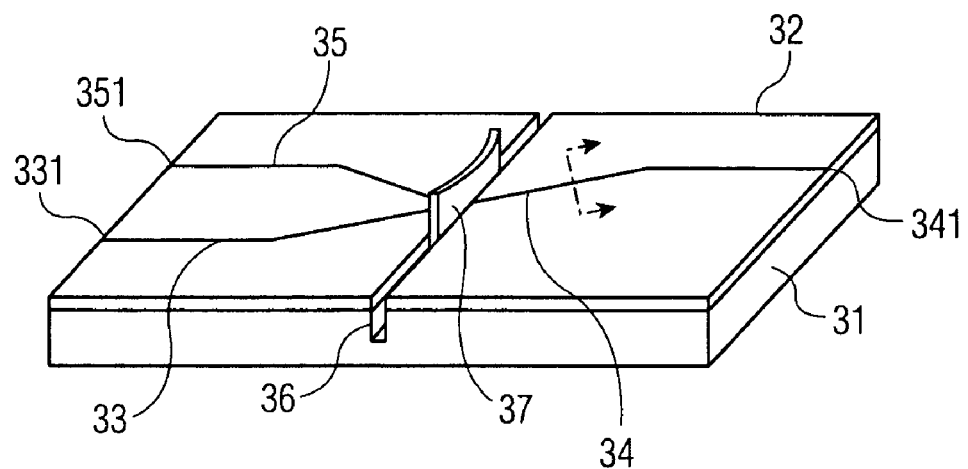
FIG. 10A and FIG. 10B show a method of mounting the conventional optical filter.
Figure 10B:
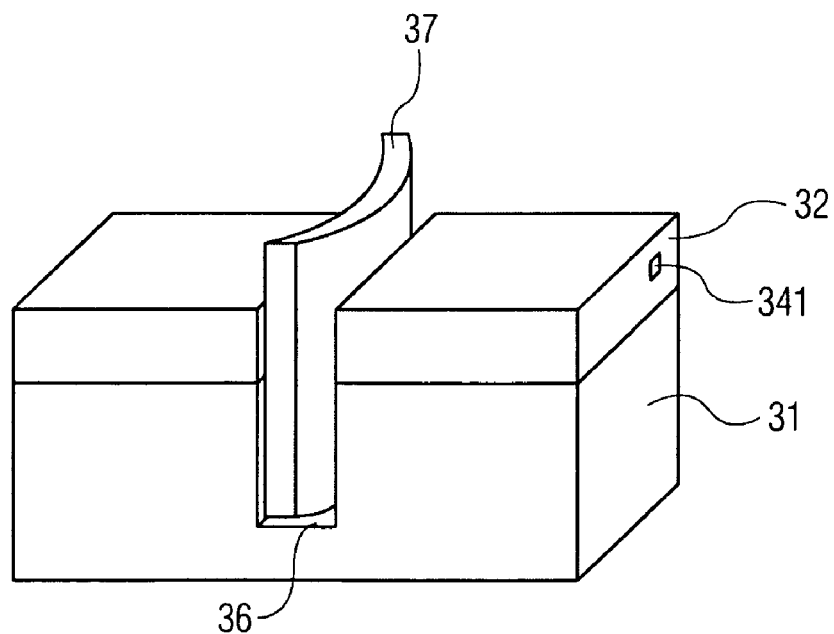

Another manufacturing method shown in FIG. 8A through FIG. 8I includes processes shown in FIG. 8A through FIG. 8C which are the same as those in the manufacturing method shown in FIGS. 7A to 7C. In FIG. 8D, upper plane substrate 3 having an optical fiber 4 mounted thereon is mounted and fixed on the main surface of the lower plane substrate 5. The lower plane substrate 5 is mounted and fixed so that the optical fiber 4 projecting from the main surface of the upper plane substrate 3 is taken, as a guide rail, along a precise V-groove 10 formed in the main surface of the lower plane substrate 5. In FIG. 8E, a filter insertion groove 1 is formed in the main surface of the lower plane substrate 5 along an end surface of the mounted upper plane substrate 3 at a certain angle with respect to a precise V-groove 11 formed in the main surface.

In the manufacturing method shown in FIG. 8A through FIG. 8E, the filter insertion groove 1 is formed after one upper plane substrate 3 is mounted and fixed on the main surface of the lower plane substrate 5, thus allowing the upper plane substrate 3 to be easily positioned. The method shown in FIG. 8A through FIG. 8E can be applicable to the manufacturing methods shown in FIG. 3A through FIG. 3G and shown in FIG. 4A through FIG. 4G. In other words, the optical fiber 4 is mounted on the lower plane substrate 5, then one upper plane substrate 3 having the precise V-groove 11 in its main surface is mounted and fixed. The filter insertion groove 1 is formed in the lower plane substrate 5 with reference to an end surface of the upper plane substrate 3. The subsequent processes shown in FIG. 8F through FIG. 8I are the same as those in the manufacturing method shown in FIGS. 7F and 7I, and therefore, their explanations are omitted.

INDUSTRIAL APPLICABILITY

According to the present invention, precise V-grooves are formed in main surfaces of upper and lower plane substrates, and an optical fiber is mounted in the V-grooves, thereby allowing the optical fiber to me mounted easily on the main surface. The precise v-groove formed in the main surface of one plane substrate functions as a guide rail, the other plane substrate grapples a multi-layer film filter inserted into an insertion groove. This arrangement provides an optical filter module in which shape deformation, such as camber, of the multi-layer film filter does not affect, the upper plane substrate is easily positioned, and adjustment of an optical axis is not required.

The invention claimed is:

1. A method of manufacturing an optical filter module, comprising the steps in the following order of:
   providing a first substrate having a first groove and a filter insertion groove crossing the first groove;
   providing a second substrate having a second groove;
   disposing an optical fiber in the second groove;
   dividing the second substrate into third and fourth substrates after said step of disposing the optical fiber in the second groove;
   inserting a filter into the filter insertion groove;
   disposing the third and fourth substrates on the first substrate so as to dispose the optical fiber disposed In the second groove into the first groove;
   grappling the filter inserted into the filter insertion groove with the third and fourth substrates; and
   fixing the third and fourth substrates to the first substrate after said step of grappling the filter.

2. The method according to claim 1, wherein said step of grappling the filter comprises the sub-step of moving the third substrate disposed on the first substrate toward the filter inserted into the filter insertion groove.

3. The method according to claim 2, wherein said step of grappling the filter further comprises the sub-step of moving the fourth substrate disposed on the first substrate toward the filter.

4. The method according to claim 3, wherein said sub-step of moving the fourth substrate is executed after said sub-step of moving the third substrate.

5. The method according to claim 1, further comprising the step of:
   cutting the optical fiber simultaneously to said step of dividing the second substrate.

6. A method of manufacturing an optical filter module, comprising the steps of;
   providing a first substrate having a first groove and a filter insertion groove crossing the first groove;
   providing second and third substrates having second and third grooves, respectively;
   inserting a filter into the filter insertion groove;
   fixing a first optical fiber in the second groove to allow an end of the first optical fiber to fit to an end surface of the second substrate;
   fixing a second optical fiber in the third groove to allow an end of the second optical fiber to fit to an end surface of the third substrate;
   disposing the second and third substrates on the first substrate to allow the fixed first fiber and the fixed second optical fiber to be disposed in the first groove;
   grappling the filter inserted into the filter Insertion groove with the second and third substrates; and
   fixing the second and third substrates to the first substrate after said step of grappling the filter inserted into the filter insertion groove with the second and third substrates.

7. The method according to claim 6, wherein said step of grappling the filter comprises the sub-step of moving the second substrate toward the filter.

8. The method according to claim 6, wherein said step of grappling the filter further comprises the sub-step of moving the third substrate toward the filter.

9. The method according to claim 8, wherein said sub-step of moving the third substrate is executed after said sub-step of moving the second substrate.

10. An optical filter module comprising:
    a filter;
    first and second optical fibers having respective cross sections face each other on respective sides of said filter, wherein said first and second optical fibers comprise core radius expansion fibers;
    a first substrate having a surface having a first groove and a filter insertion groove formed therein, said first groove holding said first and second optical fibers therein, said filter insertion groove fixing said filter therein and crossing said first groove;
    a second substrate grappling said first optical fiber with said first substrate, said second substrate having a second groove formed therein for holding said first optical fiber therein; and
    a third substrate grappling said second optical fiber with said first substrate, grappling said filter with said second substrate, and having a third groove formed therein for holding said second optical fiber therein,
    wherein said first through third substrates and said first and second optical fibers are coupled through one of a photo-curing adhesive and a heat curing adhesive.

11. The optical filter module according to claim 10, wherein respective end surfaces of said first and second optical fibers facing said filter have expanded radiuses of cores thereof.

12. The optical filter module according to claim 10, wherein said filter abuts on a wall of said filter insertion groove.

* * * * *

UNITED STATES PATENT AND TRADEMARK OFFICE
CERTIFICATE OF CORRECTION

PATENT NO. : 7,172,344 B2
APPLICATION NO. : 10/381506
DATED : August 14, 2003
INVENTOR(S) : Kazunari Nishihara et al.

It is certified that error appears in the above-identified patent and that said Letters Patent is hereby corrected as shown below:

Cover Page

After field [65], insert
-- Foreign Application Priority Data  10/04/2001  (JP)  2001-308310 --.

Column 12

Line 7, delete "Insertion" and insert -- insertion --.
Line 16, delete "6" and insert -- 7 --.

Signed and Sealed this

Fourteenth Day of August, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,172,344 B2 | Page 1 of 1 |
| APPLICATION NO. | : 10/381506 | |
| DATED | : February 6, 2007 | |
| INVENTOR(S) | : Kazunari Nishihara et al. | |

It is certified that error appears in the above-identified patent and that said Letters Patent is hereby corrected as shown below:

Cover Page

After field [65], insert
-- Foreign Application Priority Data  10/04/2001  (JP)  2001-308310 --.

Column 12

Line 7, delete "Insertion" and insert -- insertion --.
Line 16, delete "6" and insert -- 7 --.

This certificate supersedes Certificate of Correction issued August 14, 2007.

Signed and Sealed this

Fourth Day of September, 2007

JON W. DUDAS
*Director of the United States Patent and Trademark Office*